United States Patent [19]

Heitner

[11] Patent Number: 4,588,798
[45] Date of Patent: May 13, 1986

[54] PROCESS FOR PREPARING ACRYLIC POLYMER SHEETS USING A DUAL PEROXIDE INITIATOR SYSTEM

[75] Inventor: Barry J. Heitner, Bartlett, Tenn.

[73] Assignee: E. I. Du Pont de Nemours and Company, Wilmington, Del.

[21] Appl. No.: 697,402

[22] Filed: Feb. 1, 1985

[51] Int. Cl.[4] .......................... C08F 4/38; C08F 20/14
[52] U.S. Cl. ..................................... 526/228; 525/263;
526/309; 526/323.2; 526/328.5; 526/329.2;
526/329.3; 526/329.5; 526/329.7
[58] Field of Search .................... 526/228, 309, 323.2,
526/328.5, 329.2, 329.3, 329.5, 329.7; 525/263

[56] References Cited

U.S. PATENT DOCUMENTS

| | | | |
|---|---|---|---|
| 3,113,114 | 12/1963 | Maginn et al. | 526/228 |
| 3,726,846 | 4/1973 | Squire et al. | 526/228 |
| 3,726,848 | 4/1973 | Squire et al. | 526/228 |
| 3,763,128 | 10/1973 | Lewis et al. | 526/329.7 |
| 4,110,526 | 8/1978 | Hamada et al. | 526/329.7 |
| 4,152,506 | 5/1979 | Novak | 526/329.7 |
| 4,197,215 | 4/1980 | Dudinyak | 526/329.7 |
| 4,214,064 | 7/1980 | Kanazawa | 526/329.7 |
| 4,328,329 | 5/1982 | Novak | 526/329.7 |

*Primary Examiner*—Harry Wong, Jr.
*Attorney, Agent, or Firm*—Donald W. Huntley

[57] ABSTRACT

A process for producing acrylic polymers which have high thermal stability, are free of defects and have a low level of unreacted monomer. The process includes the polymerization at a high production rate of a methyl methacrylate syrup in the presence of a mixture of two peroxide initiators. The first initiator has a 5-minute half-life at temperatures between about 75° C. to 100° C. and emits a maximum of 1 mole of carbon dioxide per 2 moles of free radicals. The second initiator has a one minute half-life at temperatures of between about 105° C. to about 125° C. and emits a maximum of 1 mole of carbon dioxide per 1 mole of free radicals.

5 Claims, No Drawings

PROCESS FOR PREPARING ACRYLIC POLYMER SHEETS USING A DUAL PEROXIDE INITIATOR SYSTEM

BACKGROUND OF THE INVENTION

1. Field of the Invention

This invention relates to the production of acrylic polymers. More particularly, it relates to the use of a dual peroxide initiator system whereby the acrylic sheet may be made at a high production rate yet yield sheet which has high thermal stability, is bubble free, and has a low level of unreacted monomer.

2. Description of the Prior Art

The manufacture of acrylic polymers such as cast poly(methyl methacrylate) has increased substantially due to growing demand. With increasing use of acrylic polymer, much effort has been made to find faster polymerization systems which will improve production rates. While there has been notable success in finding ways to shorten polymerization times, the quality of the finished product has also deteriorated.

Casting of methyl methacrylate monomer containing some polymer, commonly referred to as prepolymer or prepoly syrup, was for years carried out in cells prepared from plate glass, flexible gaskets and steel clips. This type of process was slow, taking 16–170 hours. Polymerization times were shortened with the development of continuous processes such as those described in U.S. Pat. Nos. 3,872,197 issued Mar. 18, 1975 and 4,046,850 issued Sept. 6, 1977, both to Kato et al. While the residence time in the continuous casting units described in these patents is much shorter than in the cell casting operation, the units are very expensive making it desirable to increase the production rates as much as possible.

A variety of initiators and initiator systems have been suggested and used to increase the production rate of cast poly(methyl methacrylate) sheet. Many have been combinations of a variety of peroxide and azo initiators. In fact, dual initiator systems of different peroxide/peroxide, peroxide/azo, and azo/azo initiators have been tried. A good description of these prior art initiator systems is found in U.S. Pat. No. 4,328,329 issued May 4, 1982, to Ernest R. Novak, which is assigned to the same assignee as the present application. Novak was concerned with finding a combination of initiators which would provide fast polymerization with low residual monomer. To do so, he selected a dual initiator system consisting of an active peroxide and less active azo. The active peroxide (t-butyl or t-pentyl peroxyneodocanoate) insured fast polymerization. The less active azo (2,2'-azobis(isobutyronitrile)) reduced the residual monomer to acceptable levels. Together, these initiators provided a combination which seemed to work well.

In reviewing other prior art initiator systems in his patent, Novak disclosed a dual peroxide described in an article by D. W. Wood, Plastics Engineering, May 1975, pp. 51-53. Wood's article recommended the combined use of t-butyl peroxyneodecanoate and decanoyl peroxide. The last paragraph of the Wood article, however, stated: "The resulting cured castings were hard and glasslike, and exhibited some cavities that could be attributed to shrinkage during polymerization of the material." Acrylic sheet containing cavities is unacceptable. Novak repeated Wood's experiments and confirmed that voids formed in the sheet. He also found that the unconverted monomer was 8.9 and 11.4% in the two experiments he conducted. Since good quality acrylic sheet should have less than 2.5% residual monomer and no voids or cavities. Novak concluded that his peroxide/azo initiator system was superior to the dual peroxide suggested in the Wood article.

Subsequently, it was found that acrylic sheet produced in accordance with the Novak patent was prone to bubble formation when heated. This problem was particularly severe when the acrylic sheet was thermoformed at temperatures at about or above 200° C. since gas solubility decreases with increasing temperature. The bubble formation was aggravated by nitrogen gas which is emitted as the azo initiator decomposes during polymerization. The nitrogen is less soluble in acrylic sheet than such gases as carbon dioxide and will cause bubbles to form at lower concentrations. This problem is less likely to occur with peroxides which emit carbon dioxide when they decompose. The carbon dioxide is more soluble than nitrogen and is less likely to cause bubbling either during polymerization or subsequently during thermoforming of the acrylic sheet. However, the decomposition properties of the peroxides need to be selected carefully since too much carbon dioxide can also cause bubbling and adversely affect thermal stability.

It is desirable to have an initiator system which will provide a fast production rate, produce sheet free of cavities or other defects, relatively free of residual monomer and which has high thermal stability so that it can be subsequently thermoformed at temperatures at or above 200° C. without bubble formation. The peroxide/azo initiators of the Novak patent achieved a fast production rate and low residual monomer, but did not provide sheet with high thermal stability. The dual peroxide system disclosed in the Wood article, as noted by both Wood and Novak, produced sheet with cavities.

SUMMARY OF THE INVENTION

The present invention achieves all the aforestated goals by employing in the polymerization of methacrylate syrup, a mixture of two types of peroxide initiators with half-life and decomposition properties matched carefully to the temperature conditions during polymerization of the syrup.

According to the present invention, there is provided a process for preparing an acrylic polymer selected from the group consisting of methyl methacrylate homopolymer and copolymers of methyl methacrylate with $\alpha,\beta$-ethylenically unsaturated compounds which process comprises polymerizing a syrup containing 10–40% by weight of said methyl methacrylate homopolymer or copolymer in monomeric methyl methacylate, wherein the improvement comprises mixing said syrup with an initiator solution to give concentrations of between about 0.3 to 16 moles per 1 million grams of syrup of a first peroxide initiator which has a 5-minute half-life at temperatures between about 75° C. to 100° C. and which emits a maximum of 1 mole of carbon dioxide per 2 moles of free radicals, and of between about 0.1 to 6 moles per 1 million grams of syrup of a second peroxide initiator which has a 1 minute half-life at temperatures between about 105° C. to 125° C. and which emits a maximum of 1 mole of carbon dioxide per 1 mole of free radicals.

first heating the mixture of said syrup and said initiator solution to a temperature of between about 45° C. to 90° C. for between about 10 to 100 minutes wherein about 80–90% polymerization occurs, and subsequently heating said mixture to a temperature of between about 110° C. to 140° C. wherein at least 97.5% polymerization occurs.

DETAILED DESCRIPTION OF THE INVENTION

The present invention utilizes two peroxide initiators to produce acrylic sheet at a high production rate that has good thermal stability and is bubble free and that is relatively free of residual monomer and defects such as cavities. Except for the initiators and concentrations used, the polymerization of the methyl methacrylate (MMA) syrup is generally the same as that disclosed in the Novak patent which is hereby incorporated by reference.

The preparation of the prepolymer or prepoly syrup of, for example, polymer-in-monomer solution is well known and can be prepared by any well known method. For example, the syrup can be made by heating a small amount of a polymerization initiator in a solution in the methacrylate ester, optionally in the presence of a chain transfer agent, at a suitable pressure and temperature. Heating is continued until the solution reaches a predetermined viscosity. Thereafter, the hot solution is cooled. More specifically, a syrup having a viscosity of 0.5–100 poises at 25° C. can be produced from methyl methacrylate by heating the monomeric methyl methacrylate in a jacketed kettle at a temperature of 50°–150° C. under refluxing conditions. Normally, atmospheric pressure is used, and the refluxing material is stirred. The heating is conducted in the presence of a very small amount of initiator. When the desired viscosity is attained, the polymerization is stopped by cooling the mixture in any suitable manner. Cooling can be by any conventional means. One method involves adding 1–10% by weight of cold methyl methacrylate containing sufficient hydroquinone or other polymerization inhibitor to inhibit further polymerization of the methyl methacrylate.

The prepoly syrup solution usually contains 10–40% by weight of the methyl methacrylate polymer dissolved in the methyl methacrylate monomer. The polymer ordinarily has an inherent viscosity of 0.35–1.0 determined at 20° C. using a solution of 0.50 gram of the polymer per 100 milliliters of methylene chloride. As mentioned previously, the polymer can also be a copolymer involving a major portion of the methyl methacrylate monomer with such monomers as vinyl acetate, styrene, methyl acrylate, ethyl acrylate, butyl acrylate (BA), cyclohexyl acrylate, 2-ethylhexyl acrylate, acrylonitrile, ethyl methacrylate, butyl methacrylate, cyclohexyl methacrylate, 2-ethylhexyl methacrylate, methacrylonitrile, and the like.

The prepoly syrup is used to prepare cast methyl methacrylate articles, such as sheets, by either cell or continuous processes. For casting, temperatures of between 45° C. to 90° C. are usually employed, and for post curing, temperatures of between 110° C. to 140° C. are used. Pressure employed during casting is usually autogenous pressure.

The peroxide initiators used to polymerize the syrup are carefully selected based upon their half-life and decomposition properties. The initiator mixture contains a first initiator (also referred to herein as initiator A) which will polymerize the syrup from about 20% conversion to about 80 to 90% conversion during a first heating at between 45° C. and 90° C. The second initiator (also referred to herein as initiator B) of the mixture will increase the conversion to at least 97.5% polymerization during a second heating of between about 110° C. to 140° C. during final cure.

In order to produce acrylic sheet quickly, the first initiator should be selected such that the polymer is polymerized to about 80 to 90% conversion in 10 to 100 minutes, depending upon the thickness of the cast sheet. Generally, initiators with a 5-minute half-life at 75° C. to 100° C. which emit a maximum of 1 mole of carbon dioxide gas per 2 moles of free radicals are preferred. Initiators which have the foregoing characteristics and which will achieve the necessary polymerization rate are certain peroxyesters such as α-cumyl peroxyneodecanoate, t-amyl peroxyneodecanoate, and t-butyl peroxyneodecanoate. While the polymerization can be carried out at temperatures ranging from about 45° C. to 95° C., it is preferred to do so at between about 55° C. to 90° C. in order to maximize the production rate polymerization. This may be done in a water bath. The optimum polymerization temperature and initiator concentration depend upon sheet thickness since thick sheet is more prone to bubble formation during polymerization. This occurs because of the poor heat transfer of the heat of reaction from the sheet to the water bath due to the low thermal conductivity of the acrylic polymers. In order to minimize bubble formation in thick sheet, the polymer temperature should therefore not exceed 105° C. while in the water bath.

The second initiator of the mixture is selected to maximize the polymerization rate during the cure such that conversion is increased to at least 97.5% in 5 to 60 minutes. After the sheet is taken from the 55° C. to 90° C. water bath, it is heated to between about 110° C. to 140° C. in, for example, a glycol bath or an infrared oven. The sheet is then cooled to about 90° C. The sheet is above 110° C. for about 5 to 60 minutes. Again, the time is dependent upon sheet thickness. The second initiator is selected such that it is consumed by the time the sheet is cooled to 90° C. Generally, initiators with a one minute half-life at temperatures of between about 105° C. to 125° C. and which emit a maximum of 1 mole of carbon dioxide gas per one mole of free radicals can produce sheets with polymer conversion of at least 97.5%. Initiators which have the foregoing characteristics are certain diacyl peroxides such as diisononanoyl, dilauroyl, and didecanoyl peroxides. Also having these characteristics are peroxyester peroxides such as t-butyl peroxypivalate and 2,5 dimethyl-2,5bis(2-ethyl hexoyl peroxy)hexane. Didecanoyl peroxide and 2,5-dimethyl-2,5-bis(2-ethyl hexoyl peroxy)hexane are preferred since they will produce the highet conversion over the widest range of operating conditions.

The initiator concentration is preferably between about 0.3 to 16 moles per 1 million grams of syrup of the first peroxide initiator and between about 0.1 to 6 moles per 1 million grams of syrup of the second peroxide initiator. The exact concentrations of each initiator used will depend upon a number of factors such as sheet thickness, the chain transfer agent, the crosslinking agent, the pigment and the comonomer concentrations. Thicker sheet, for example, will use concentrations toward the lower end of the above range while thinner sheet toward the middle and upper end of the range.

For thermoformable sheets, chain transfer agents and crosslinking agents are employed. The chain transfer agent can be a mercaptan, e.g., alkyl mercaptans of up to 20 carbon atoms, especially n-alkyl mercaptans of between about 4 to 20 carbon atoms, or aryl mercaptans in which the aryl group can be phenyl or naphthaly and which can contain alkyl (of 1-12 carbon atoms) or halogen (Cl, Br, I) substituents: polyhaloalkanes (preferably of 1-5 carbon atoms); phosphines such as $R_2PH$ or $RPH_2$ wherein R is aryl of 6-10 carbon atoms, or alkyl of 1-10 carbon atoms.

The crosslinking agent can be any organic compound that is copolymerizable with the methyl methacrylate monomer and which contains at least two ethylenically unsaturated double bonds, e.g., a diacrylate or dimethacrylate, such as the alkylene or hydroxy substituted alkylene diacrylates or dimethacrylate, e.g., 1,2-ethylene dimethacrylate or 1,6-hexanediol dimethylacrylate.

In addition, UV stabilizers, thermal stabilizers, polymerization inhibitors, dyes and pigments may be added.

Acrylic sheet produced with dual peroxides in accordance with the process of the present invention has a higher thermal stability and is less prone to bubble formation than sheet produced with prior art processes using peroxide/azo or dual azo initiators. This is due to the decomposition characteristics of the initiators selected. When peroxides decompose during polymerization, they emit carbon dioxide. Azo initiators emit nitrogen. Nitrogen is less soluble in acrylic sheet than carbon dioxide and will cause bubbles to form at lower concentrations than carbon dioxide. To minimize bubble formation, improve thermal stability and maintain a high production rate, peroxide initiators are selected with certain half-life and decomposition properties. As is commonly known, acrylic polymers have an affinity for water. Water can be adsorbed into the sheet from the surrounding air reaching concentration as high as 2%. When acrylic polymer adsorbs water or water is added to the casting syrup, the thermal stability of acrylic sheet decreases sharply. If the polymer is dried, such as in an oven, then the thermal stability increases back to its original degree of stability.

Thermal stability can be measured by three different methods. In the first, the sheet is placed in an air circulating oven for 30 minutes at 180° C. In the second, the sheet is placed in the same type of oven for 90 minutes at 193° C. If the sheet is bubble free after removal from the oven, it passes these tests.

The third test is called an infrared (IR) bubble test in which a small piece of sheet with a thermolabel (a temperature sensitive tape which changes color when it is heated to its thermolabile temperature) attached is placed into an infrared oven which has a window. An operator watches the sheet as it heats and removes the sheet when bubbles begin to form. The temperature at which bubbles form is called the IR bubble temperature.

The invention may be further understood by the following examples.

EXAMPLE 1

A casting syrup was made using 225 g prepoly syrup ($\approx$19% polymer, 1000 cp), 12.51 g initiator solution and 12.50 g EDMA/LM solution. Initiator solution contained 4.5731 g t-butyl peroxyneodecanoate (75% purity), 0.2120 g Tinuvin® P, 0.8209 g Topanol® A (10% purity in MMA solution), 0.1426 g Aerosol® OT, 1.7806 g didecanoyl peroxide and 92.5546 g MMA. The EDMA/LM solution contained 7.0 g ethylene glycol dimethacrylate (EDMA), 4.0 g lauryl mercaptan, and 89.0 g MMA. The casting syrup was mixed for 30 minutes using a magnetic stirrer. It was then degassed for 15 minutes at 40 mm Hg absolute pressure while mixing. Vacuum was then released with argon gas. The casting syrup was poured into 3-125 mil casting cells. The cells had PVC gasket around the edges to prevent syrup from escaping the cell. The cells were held together with clamps. In the middle of one cell, a thermocouple was placed to measure the sheet/syrup temperature. The thermocouple was held in place by a small piece of gasket in the middle of the sheet to be sure the thermocouple read the syrup temperature instead of the steel plate temperature. The three casting cells were placed in an 83° C. water bath. The Tromsdorff peak occurred after 21 minutes in the bath. The castings were taken out of the bath after 22 minutes and then placed in an 134° C. ethylene glycol bath for three minutes. Then the castings were removed from the glycol bath and allowed to cool be being exposed to room air. Once the sheets cooled to 90° C., they were quenched in cold water (15°-25° C.). Then the sheet was removed from the casting cells.

The sheet had a residual monomer level of 1.99%. It passed the 193° C.—90 min stability test (no bubble formation) and had an I.R. bubble temperature of 210° C. Initiator A concentration was $7.0 \times 10^{-6}$ moles/g sheet and initiator B concentration was $2.59 \times 10^{-6}$ moles/g sheet. Sheet condition was bubble free.

EXAMPLE 2

A casting syrup was made using 258.03 g prepoly, 15.06 g initiator solution, 15.03 g EDMA/LM solution, and 12.02 g n-butyl acrylate (BA). Solutions were of the same composition as in Example 1. The same procedure as in Example 1 was followed.
Bath Temperature—76° C.
Peak Time—31 minutes
Time in 76° C. bath—32 minutes
Initiator A concentration:
 $7.00 \times 10^{-6}$ moles/g sheet
Initiator B concentration:
 $2.59 \times 10^{-6}$ moles/g sheet
Residual MMA—0.78%
Residual BA—0.09%
193° C.—90 min stability test—pass
IR bubble temperature—218° C.
Sheet condition—bubble free

EXAMPLE 3

A casting syrup was made using 258.11 g prepoly, 15.05 g initiator solution, 15.06 g EDMA/LM solution and 12.02 g n-butyl acrylate. Initiator solution contained 1.3678 g t-butyl peroxyneodecanoate (75% purity), 0.0629 g Tinuvin® P, 0.2395 g Topanol® A (10% purity), 0.0434 g Aerosol® OT, 0.9507 g dilauroyl peroxide, and 27.3565 g MMA. Followed same procedures as in Example 1.
Bath Temperature—76° C.
Peak Time—29 minutes
Time in 76° C. bath—31 minutes
Initiator A concentration:
 $7.00 \times 10^{-6}$ moles/g sheet
Initiator B concentration:
 $3.90 \times 10^{-6}$ moles/g sheet
Residual MMA—1.54%
Residual BA—not determined
193° C.—90 min stability test—pass IR bubble temperature—210° C.
Sheet condition—bubble free

EXAMPLE 4

A casting syrup was made in a continuous casting process (plant scale) wherein all the ingredients were added to one tank. The ingredients included 29963 g BL 6223 pigment, 3016 g lauryl mercaptan, 5278 g ethylene glycol dimethacrylate, 3438 g t-butyl peroxyneodecanoate (75% purity), 1342 g didecanoyl peroxide, 151 g Tinuvin® P, 106 g Aerosol® OT, 603 g Topanol® A (10% purity), 60318 g n-butyl acrylate, 1313 liters prepoly (1450 CP), and 95.4 liters MMA.

The casting syrup viscosity was 630 CP. The contents of the tank were mixed for 45 minutes and then pumped to a deaerator where the syrup was exposed to vacuum ranging from 50–65 mm Hg absolute pressure. Then the syrup was pumped onto the belt. The water spraying on the back sides of the belts was at 82° C.

The sheet stayed in the water zone for about 27 minutes and then was heated to about 125° C. by infrared heat. The sheet was then cooled to about 90° C. and released from the belt.

Initiator A concentration:
  $7.00 \times 10^{-6}$ moles/g sheet
Initiator B concentration:
  $2.59 \times 10^{-6}$ moles/g sheet
Residual MMA—0.80%
Residual BA—0.12%
193° C.—90 min stability—pass
204° C.—90 min stability test—pass
IR bubble temperature—260° C.
Sheet condition—bubble free

EXAMPLE 5

A casting syrup was made using 190.02 g prepoly, and 10.01 g initiator solution. Initiator solution contained 0.40 g Topanol® A (10% purity), 0.04 g Aerosol® OT, 0.20 g Tinuvin® P, 2.10 g t-butyl peroxyneodecanoate, (75% purity), 0.50 g didecanoyl peroxide and 96.17 g MMA. Followed same procedure as in Example 1.

Bath Temperature—76° C.
Peak Time—25 minutes
Time in 76° C. bath—26 minutes
Initiator A concentration:
  $3.22 \times 10^{-6}$ moles/g sheet
Initiator B concentration:
  $0.73 \times 10^{-1}$ moles/g sheet
Residual MMA—1.38%
Inherent viscosity=1.69
180° C.—30 min stability test—fail
Sheet condition—bubble free

EXAMPLE 6

A batch casting syrup was made using 172.03 g prepoly (2000 CP, ≈22% polymer), 10.01 g initiator solution, 10.02 g EDMA/LM solution and 8.01 g n-butyl acrylate. Initiator solution contained 1.79 g didecanoyl peroxide, 0.20 g Tinuvin® P, 0.81 g Topanol® A (10% purity), 0.14 g Aerosol® OT, 8.00 g t-butyl peroxyneodecanoate, (75% purity), and 89.08 g MMA. Followed the same procedure described in Example 1.

Bath Temperature—90° C.
Peak Time—13 minutes
Time in water bath—14 minutes
Initiator A concentration:
  $12.3 \times 10^{-6}$ moles/g sheet
Initiator B concentration:
  $2.59 \times 10^{-6}$ moles/g sheet
Residual MMA—0.79%
Residual BA—0.10%
193° C.—90 min stability test—fail
IR bubble temperature—204° C.
Sheet condition—bubble free except at gasket edge

EXAMPLE 7

A casting syrup was made using 258.3 g prepoly, 15.05 g initiator solution, 15.0 g EDMA/LM solution and 12.03 g n-butyl acrylate. Initiator solution contained 2.7371 g t-butyl peroxyneodecanoate (75% purity), 0.1224 g Tinuvin® P, 0.5075 g Topanol® A (10% purity), 0.0824 g Aerosol® OT, 0.7690 g Vazo® 64, and 55.8142 g MMA. Followed the same procedure described in Example.

Bath Temperature—90° C.
Peak Time13 18 minutes
Time in water bath—19 minutes
Initiator A concentration:
  $7.00 \times 10^{-6}$ moles/g sheet
Initiator B concentration:
  $3.90 \times 10^{-6}$ moles/g sheet
Residual MMA—0.84%
Residual BA—not determined
193° C.—90 min stability test—fail
IR bubble temperature—193° C.
Sheet condition—one bubble

EXAMPLE 8

A casting syrup was made using 190.02 g prepoly, and 10.02 g initiator solution. Initiator solution contained 2.1% t-butyl preoxyneodecanoate (75% purity), 0.24% 2,2' azobisisobutyronitrile'400 PPM Topanol® A, 2000 PPM Tinuvin® P and 97.42% methyl methacrylate. Followed same procedure as in Example 1.

Bath temperature —82° C.
Peak Time—20 minutes
Time in bath—21 minutes
Initiator A concentration:
  $3.22 \times 10^{-6}$ moles/g sheet
Initiator B concentration:
  $0.73 \times 10^{-6}$ moles/g sheet
Residual MMA—1.29%
Inherent viscosity—1.57
180° C.—30 min stability test—fail
Sheet condition—bubble free except 12 bubbles along edge of gasket

EXAMPLE 9

Made sheet using 2,2' azobisisobutyronitrile instead of didecanoyl peroxide. Followed similar procedure (continuous casting) to that described in Example 4.

Water Temperature—80° C.
Time in water bath zone—≈25 minutes
Initiator A concentration:
  $7.0 \times 10^{-6}$ moles/g sheet
Initiator B concentration:
  $2.55 \times 10^{-6}$ moles/g sheet
Residual MMA—0.65%
Residual BA—0.06%
193° C.—90 min stability test—pass
IR bubble temperature—249° C.
Sheet condition—bubble free

EXAMPLE 10

A casting syrup was made using 258.01 g prepoly, 15.01 g initiator solution, 15.03 g EDMA/LM solution, and 12.02 g n-butyl acrylate. The initiator solution contained 4.5669 g t-butyl peroxyneodecanoate (75% purity), 2.1895 g diisononanoyl peroxide (75% purity), 0.1434 g Aerosol ® OT, 0.8010 g Topanol ® A solution (10% purity), 0.2135 g, Tinuvin ® P and 92.12 g MMA. Followed same procedure as in Example 1.

Bath temperature—76° C.
  Peak time—31 minutes
  Time in water bath—32 minutes
  Initiator A concentration:
    $7.00 \times 10^{-6}$ moles/g sheet
  Initiator B concentration:
    $2.59 \times -10^{-6}$ moles/g sheet
  Residual MMA—1.75%
  Residual BA—0.28%
  193° C.—90 min stability test—pass
  IR bubble temperature—200° C.
  Sheet condition—bubble free

EXAMPLE 11

A casting syrup was made using 172.02 g prepoly, 10.01 g initiator solution, 10.01 g EDMA/LM solution and 8.00 g n-butyl acrylate. The initiator solution contained 4.56 g t-butyl peroxyneodecanoate (75% purity), 1.23 g 2,5-dimethyl-2,5-bis(2-ethyl hexoyl peroxy)hexane, 0.22 g Tinuvin ® P, 0.80 g Topanol ® A (10% solution), 0.15 g Aerosol ® OT and 93.08 g MMA. Followed same procedure as in Example 1.

Bath temperature—76° C.
  Peak Time—28 minutes
  Time in water bath—29 minutes
  Initiator A concentration:
    $7.00 \times 10^{-6}$ moles/g sheet
  Initiator B concentration:
    $1.29 \times 10^{-6}$ moles/g sheet
  Residual MMA—0.89%
  Residual BA—<0.10%
  193° C.—90 min stability—pass
  IR bubble temperature—210° C.
  Sheet condition—bubble free except at gasket edge

EXAMPLE 12

A casting syrup was made using 172.03 g prepoly, 10.01 g initiator solution, 10.02 g EDMA/LM solution, and 8.01 g n-butyl acrylate. the initiator solution contained 4.56 g t-butyl peroxyneodecanoate (75% purity), 1.19 g t-butyl peroxypivalate (75% purity), 0.20 g Tinuvin ® P, 0.81 g Topanol ® A (10% solution), 0.15 g Aerosol ® OT, and 93.12 g MMA. Followed same procedure as in Example 1.

Bath temperature—76° C.
  Peak Time—27 minutes
  Time in water bath—28 minutes
  Initiator A concentration:
    $7.00 \times 10^{-6}$ moles/g sheet
  Initiator B concentration:
    $2.56 \times 10^{-6}$ moles/g sheet
  Residual MMA—1.36%
  Residual BA—0.23%
  193° C.—90 min stability—pass
  IR bubble temperature—218° C.
  Sheet condition—bubble free except at gasket edge

EXAMPLE 13

A casting syrup was made using 172.0 g prepoly, 10.01 g initiator solution, 10.01 g EDMA/LM solution, and 8.00 g n-butyl acrylate. initiator solution contained 4.56 g t-butyl peroxyneodecanoate (75% purity), 1.27 g dibenzoyl peroxide, 0.81 g Topanol ® A (10% solution), 0.15 g Aerosol OT, 0.20 Tinuvin ® P and 94.05 g MMA. Followed same procedure as in Example 1.

Bath temperature—90° C.
  Peak Time—22 minutes
  Time in water bath—23 minutes
  Initiator A concentration:
    $7.0 \times 10^{-6}$ moles/g sheet
  Initiator B concentration:
    $2.60 \times 10^{-6}$ moles/g sheet
  Residual MMA—2.96%
  Residual BA—0.30%
  193° C.—90 min stability—pass
  IR bubble temperature—216° C.
  Sheet condition—bubble free except at gasket edge

EXAMPLE 14

A casting syrup was made using 172.0 g prepoly, 10.01 g initiator solution, 10.02 g EDMA/LM solution and 8.02 g n-butyl acrylate. initiator solution contained 4.82 g t-amyl peroxyneodecanoate (75% purity), 1.78 g didecanoyl peroxide, 0.81 g Topanol ® A (10% purity), 0.21 g Tinuvin ® P, 0.15 g Aerosol ® OT and 92.27 g MMA. Followed same procedure as in Example 1.

Bath temperature—80° C.
  Peak time—25 minutes
  Time in water bath—26 minutes
  Initiator A concentration:
    $7.0 \times 10^{-6}$ moles/g sheet
  Initiator B concentration:
    $2.60 \times 10^{-6}$ moles/g sheet
  Residual MMA—0.77%
  Residual BA—0.11%
  193° C.—90 min stability—fail
  IR bubble temperature—204° C.
  Sheet condition—bubble free except at gasket edge

EXAMPLE 15

A casting syrup was made using 170.02 g prepoly, 10.00 g initiator solution, 10.01 g EDMA/LM solution, 8.00 g n-butyl acrylate. initiator solution contained 10.02 a-cumyl peroxyneodecanoate (75% purity), 1.79 g didecanoyl peroxide, 0.81 g Topanol ® A (10% solution), 0.14 g Aerosol ® OT, 0.20 g Tinuvin ® P, and 87.09 g MMA. Followed same procedure as in Example 1.

Bath temperature—75° C.
  Peak time—21 minutes
  Time in water bath—22 minutes
  Initiator a concentration:
    $7.0 \times 10^{-6}$ moles/g sheet
  Initiator B concentration:
    $2.59 \times 10^{-6}$ moles/g sheet
  Residual MMA—0.94%
  Residual BA—0.13%
  193° C.—90 min stability—fail
  IR bubble temperature—210° C.
  Sheet condition—bubble free except at gasket edge

EXAMPLE 16

A casting syrup was made using 180.01 g prepoly, 10.02 g initiator solution, and 10.01 g EDMA/LM solution. The initiator solution contained 10.20 g t-butyl peroxyneodecanoate (75% purity), 1.78 g didecanoyl peroxide, 0.80 g Topanol ® A (10% solution), 0.14 g Aerosol ® OT, 0.21 g Tinuvin ® P, and 86.66 g MMA. Followed same procedure as in Example 1.
  Bath temperature—75° C.
  Peak time—15 minutes
  Time in water bath—16 minutes
  Initiator A concentration:
    $16.0 \times 10^{-6}$ moles/g sheet
  Initiator B concentration:
    $2.59 \times 10^{-6}$ moles/g sheet
  Residual MMA—1.13%
  143° C.—90 min stability—fail
  IR bubble temperature—210° C.
  Sheet condition—bubble free except at gasket edge

EXAMPLE 17

A casting syrup was made using 180.02 g prepoly, 10.01 g initiator solution, and 10.01 g EDMA/LM solution. The initiator solution contained 4.57 g t-butyl peroxyneodecanoate (75% purity), 4.13 g didecanoyl peroxide, 0.81 g Topanol ® (10% solution), 0.15 g Aerosol ® OT, 0.20 g Tinuvin ® P, and 90.18 g MMA. Followed same procedure as in Example 1.
  Bath temperature—80° C.
  Peak time—20 minutes
  Time in water bath—21 minutes
  Initiator A concentration:
    $7.02 \times 10^{-6}$ moles/g sheet
  Initiator B concentration:
    $6.0 \times 10^{-6}$ moles/g sheet
  Residual MMA—1.39%
  193° C.—90 min stability—pass
  IR bubble temperature—210° C.
  Sheet condition—bubble free except at gasket edge

EXAMPLE 18

A casting syrup was made using 570.02 g prepoly and 30.00 g initiator solution. The initiator solution contained 0.20 g t-butyl peroxyneodecanoate (75% purity), 0.08 g didecanoyl peroxide, 0.40 g Topanol ® A (10% solution), 0.04 g Aerosol ® OT, 0.21 g Tinuvin ® P, and 99.08 g MMA. Made 500 mil sheet by following same procedure as in Example 1.
  Bath temperature—70° C.
  Peak time—81 minutes
  Time in water bath—91 minutes
  Initiator A concentration:
    $0.30 \times 10^{-6}$ moles/g sheet
  Initiator B concentration:
    $0.10 \times 10^{-6}$ moles/g sheet
  Residual MMA—2.20%
  193° C.—90 min stability—pass
  Sheet condition—bubble free except for a void where the two ends of the gasket meet

EXAMPLE 19

A casting syrup was made using 475.02 g prepoly and 25.01 g initiator solution. The initiator solution contained 9.56 g t-butyl peroxyneodecanoate (75% purity), 1.79 g didecanoyl peroxide, 0.81 g Topanol ® A (10% solution), 0.15 g Aerosol ® OT, 0.20 g Tinuvin ® P, and 92.53 g MMA. Made 500 mil sheet by following same procedure as in Example 1.
  Bath temperature—45° C.
  Peak time—82 minutes
  Time in water bath—94 minutes
  Initiator A concentration:
    $7.00 \times 10^{-6}$ moles/g sheet
  Initiator B concentration:
    $2.59 \times 10^{-6}$ moles/g sheet
  Residual MMA—1.16%
  193° C.—90 min stability—fail
  Sheet condition—bubble free except for a void where the two ends of the gasket meet
  Time in 130° C. glycol bath—10 minutes The following tables summarize the results of the foregoing examples to illustrate the effect of different initiators on thermal stability. A code for the initiators follows the tables.

TABLE 1

SELECTION OF INITIATOR B FOR CROSSLINKED SHEET

| Ex. No. | Initiator B Name | INITIATOR B Concen. $10^{-6}$ Moles/g Sheet | 1 min Half-Life Temp (°C.) | Sheet Thickness (mil) | Water Bath Temp (°C.) | Peak Time (min) | Bubbles Formed During Polymerization | Residual MMA (%) | BA (%) | IR Bubble Temp (°) | 193° C. 90 min Stability |
|---|---|---|---|---|---|---|---|---|---|---|---|
| 2 | DCC | 2.59 | 116 | 125 | 76 | 31 | 0 | 0.78 | 0.09 | 218 | pass |
| 3 | DLP | 3.90 | 116 | 125 | 76 | 29 | 0 | 1.54 | — | 210 | pass |
| 11 | DBEH | 1.29 | 120 | 125 | 76 | 28 | 0 | 0.82 | 0.10 | 210 | pass |
| 10 | DIN | 2.59 | 112 | 125 | 76 | 31 | 0 | 1.76 | 0.28 | 220 | pass |
| 12 | BPP | 2.56 | 108 | 125 | 76 | 27 | 0 | 1.36 | 0.23 | 218 | pass |
| 13 | BP | 2.60 | 128 | 125 | 90 | 22 | 0 | 2.96 | 0.30 | 216 | pass |
| 7 | AIBN | 3.90 | 117 | 125 | 90 | 18 | 1 | 0.84 | — | 193 | fail |
| 4 | DDC | 2.59 | 116 | 125 | 82 | <27 | 0 | 0.80 | 0.12 | 260 | pass |
| 9 | AIBN | 2.55 | 117 | 187 | 80 | <25 | 0 | 0.65 | 0.06 | 249 | pass |

Note
CROSSLINKED sheet contains $7.00 \times 10^{-6}$ moles/g sheet BPND and 4% BA
Examples 7 and 9 are controls

TABLE 2

SELECTION OF INITIATOR A FOR CROSSLINKED SHEET

| Ex. No. | Initiator A Name | INITIATOR A Concen. 10$^{-6}$ Moles/g Sheet | 5 min Half-Life Temp (°C.) | Bath Temp (°C.) | Peak Time (min) | Residual MMA (%) | Residual BA (%) | Bubbles Formed During Polymerization | IR Bubble Temp (°C.) | 193° C. 90 min Stability |
|---|---|---|---|---|---|---|---|---|---|---|
| 15 | CPND | 7.0 | 78 | 75 | 21 | 0.94 | 0.13 | 0 | 210 | fail |
| 14 | APND | 7.0 | 81 | 80 | 26 | 0.77 | 0.11 | 0 | 204 | fail |
| 2 | BPND | 7.0 | 85 | 76 | 31 | 0.78 | 0.09 | 0 | 218 | pass |

Note
CROSSLINKED sheet contains 2.59 × 10$^{-6}$ moles/g sheet DDC and 4% BA

TABLE 3

MATCHING OF INITIATOR A CONCENTRATION WITH THICKNESS AND TYPE OF SHEET

| Ex. No. | Initiator A Name | Initiator A Concen. 10$^{-6}$ Moles/g Sheet | Initiator B Name | Initiator B Concen. 10$^{-6}$ Moles/g Sheet | Type | BA (%) | Sheet Thickness (mil) | Bath Temp (°C.) | Peak Time (min) | Peak Temp (°C.) | Bubbles Formed During Polymerization | Residual MMA (%) | Residual BA (%) | IR Bubble Temp (°C.) | 193° C. 90 min Stability |
|---|---|---|---|---|---|---|---|---|---|---|---|---|---|---|---|
| 18 | BPND | 0.3 | DDC | 0.10 | C | 0 | 500 | 70 | 81 | 87 | 0 | 2.20 | — | — | pass |
| 19 | BPND | 7.0 | DDC | 2.59 | C | 0 | 500 | 45 | 82 | 102 | 0 | 1.16 | — | — | fail |
| 5 | BPND | 3.22 | DDC | 0.73 | C | 0 | 125 | 76 | 25 | 79 | 0 | 1.38 | — | — | fail |
| 8 | BPND | 3.22 | AIBN | 0.73 | C | 0 | 125 | 82 | 20 | 86 | 0 | 1.29 | — | — | fail |
| 1 | BPND | 7.0 | DDC | 2.59 | D | 0 | 125 | 83 | 21 | 86 | 0 | 1.99 | — | 210 | pass |
| 6 | BPND | 12.3 | DDC | 2.59 | D | 4 | 125 | 90 | 13 | 94 | 0 | 0.79 | 0.10 | 204 | fail |
| 17 | BPND | 7.0 | DDC | 6.00 | D | 0 | 125 | 80 | 20 | 86 | 0 | 1.39 | — | 210 | pass |
| 16 | PBND | 16.0 | DDC | 2.59 | D | 0 | 125 | 75 | 15 | 83 | 0 | 1.13 | — | 210 | fail |

NOTE
SHEET TYPE
C - LINEAR
D - CROSSLINKED

| Code | Initiator |
|---|---|
| DDC | didecanoyl peroxide |
| DLP | dilauroyl peroxide |
| DIN | diisononanoyl peroxide |
| BP | dibenzoyl peroxide |
| BPP | t-butyl peroxypivalate |
| DBDH | 2,5-dimethyl-2,5-bis(2-ethyl hexoyl peroxy)hexane |
| AIBN | 2,2'-azobisisobutyronitrile |
| BPND | t-butyl peroxyneodecanoate |
| CPND | a-cumyl peroxyneodecanoate |
| APND | t-amyl peroxyneodecanoate |

A comparison of control Example 7 with Examples 2, 3, 10, 11, and 12 in Table 1 shows that the use of a dual peroxide initiator system results in sheet that has a higher thermal stability as measured by the IR bubble temperature test. These results were again demonstrated with continuous casting wherein the sheet that was made with the dual peroxide system (Example 4) had a higher degree of thermal stability than that made with a peroxide/azo initiator system (control Example 9).

Sheet made with the dual peroxide initiator system containing dibenzoyl peroxide (Example 13) had high residual monomer and is considered unacceptable. Dibenzoyl peroxide has a 1 minute half-life temperature of about 128° C. which is above the 125° C. upper limit preferred for the second peroxide initiator.

When the initiator loading or temperature is increased, the peroxide/azo initiator system is more likely to form bubbles during polymerization than the dual peroxide system as shown by comparison of Examples 6 (Table 3) and control Example 7 (Table 1). Bubbles forming along the edge of the gasket have been discounted because it occurs with both initiator systems (dual peroxide and peroxide/azo), is caused by diffusion of the PVC plasticizer in the gasket into the acrylic polymer, and is in the strip normally cut off when the gasket is discarded.

Table 2 shows that a-cumyl peroxyneodecanoate t-amyl peroxyneodecanoate and t-butyl peroxyneodecanoate can be used to produce sheet with good thermal stability at a high production rate.

Table 3 shows that the dual peroxide system can be used to produce sheet of various thickness. The advantage of the dual peroxide system is not as great in linear sheet as in crosslinked sheet because very little of the second initiator is normally used in linear sheet. As seen in Table 3, thick sheet needs less initiator than thin sheet and is polymerized at lower temperatures in order to avoid bubble formation during polymerization. The voids which form in 500 mil sheet where the two ends of the gasket meet are seen in the laboratory 66"×6" castings in the peroxide/azo as well as dual peroxide system; however, it is not a problem in the continuous casting process. In large commercially size castings, this is not expected to be a problem. The voids are believed caused by inflexibility of the gasket to make a good seal. Some thick void-free sheet has been made on 6"×6" castings using the dual peroxide system producing circular sheet.

I claim:

1. In a process for preparing an acrylic polymer sheet, said polymer selected from the group consisting of methyl methacrylate homopolymer, copolymers of methyl methacrylate with α,β-ethylenically unsaturated compounds and mixtures thereof, which process comprises polymerizing a syrup having a viscosity of 0.5-100 poises at 25° C. and containing 10-40% by weight of a methyl methacrylate homopolymer, copolymer of methyl methacrylate with α,β-ethylenically unsaturated compounds, said copolymer comprising a major portion of methyl methacrylate or mixtures thereof, in monomeric methyl methacrylate, the improvement which comprises mixing said syrup with an initiator solution to give concentration of between about 0.3 to 16 moles per 1 million grams of syrup of a first peroxide initiator which has a 5-minute half-life at temperatures between about 75° C. to 100° C. and which emits a maximum of 1 mole of carbon dioxide per 2 moles of free radicals, and of between about 0.1 to 6 moles per 1 million grams of syrup of a second peroxide initiator which has a 1 minute half-life at temperatures between about 105° C. to 125° C. and which emits a maximum of 1 mole of carbon dioxide per 1 mole of free radicals, first heating the mixture of said syrup and said initiator solution to a temperature of between about 45° C. to 90° C. for between about 10 to 100 minutes wherein about 80–90% polymerization occurs, and subsequently heating said mixture to a temperature of between about 120° C. to 140° C. wherein at least 97.5% polymerization occurs.

2. The process of claim 1 wherein the first peroxide initiator is selected from the group consisting of α-cumyl peroxyneodecanoate, t-amyl peroxyneodecanoate and t-butyl peroxyneodecanoate.

3. The process of claim 1 wherein the second peroxide initiator is selected from the group consisting of diisononanoyl, dilauroyl or didecanoyl peroxide, 2,5-dimethyl-2,5-bis(2-ethyl hexoyl peroxy)hexane, and t-butyl peroxypivalate.

4. The process of claim 3 wherein the second peroxide initiator is didecanoyl peroxide.

5. The process of claim 3 wherein the second peroxide initiator is 2,5-dimethyl-2,5-bis(2-ethyl hexoyl peroxy)hexane.

* * * * *